(12) United States Patent
Tsujimura et al.

(10) Patent No.: US 11,924,388 B2
(45) Date of Patent: Mar. 5, 2024

(54) IMAGE RECORDING APPARATUS AND FEED TRAY THAT INCLUDES A SIDE GUIDE INSIDE A PAIR OF SIDEWALLS FOR ROLL PAPER

(71) Applicant: BROTHER KOGYO KABUSHIKI KAISHA, Nagoya (JP)

(72) Inventors: Yuki Tsujimura, Nagoya (JP); Kengo Noda, Inazawa (JP); Satoshi Miyase, Gamagori (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/173,127

(22) Filed: Feb. 23, 2023

(65) Prior Publication Data

US 2023/0276010 A1 Aug. 31, 2023

(30) Foreign Application Priority Data

Feb. 25, 2022 (JP) ................................. 2022-028367

(51) Int. Cl.
*H04N 1/08* (2006.01)
*H04N 1/00* (2006.01)
*H04N 1/034* (2006.01)

(52) U.S. Cl.
CPC ......... *H04N 1/034* (2013.01); *H04N 1/00519* (2013.01); *H04N 1/00602* (2013.01); *H04N 1/00623* (2013.01); *H04N 1/0079* (2013.01); *H04N 1/0826* (2013.01)

(58) Field of Classification Search
CPC .............. H04N 1/034; H04N 1/00519; H04N 1/00602; H04N 1/00623; H04N 1/0079; H04N 1/0826
See application file for complete search history.

(56) References Cited

U.S. PATENT DOCUMENTS

2008/0018045 A1 1/2008 Sakanashi
2022/0204297 A1 6/2022 Noda et al.

FOREIGN PATENT DOCUMENTS

| JP | 11-334931 A | 12/1999 |
| JP | 2008-24452 A | 2/2008 |
| JP | 2021-38096 A | 3/2021 |
| JP | 2022-104657 A | 7/2022 |

OTHER PUBLICATIONS

English Machine Translation of JP2002255367-A (Iwamoto et al., Published Sep. 11, 2002) (Year: 2002).*

* cited by examiner

*Primary Examiner* — Juan M Guillermety
(74) *Attorney, Agent, or Firm* — Merchant & Gould P.C.

(57) ABSTRACT

An image recording apparatus includes a feed tray, a feed mechanism feeding a sheet-shaped medium accommodated in the feed tray, and a recording device recording an image on the sheet-shaped medium fed by the feed mechanism. The feed tray includes a first accommodation portion accommodating a roll, in which the sheet-shaped medium is rolled, a pair of side walls interposing the sheet-shaped medium unrolled from the roll in a first direction parallel to an axis of the roll, and a side guide disposed inside the pair of side walls and having an inner-side surface contactable with an edge in the first direction of the first sheet-shaped medium unrolled from the roll. The side guide has a metal portion made of metal, the metal portion forming at least part of the inner-side surface.

17 Claims, 9 Drawing Sheets

IMAGE RECORDING APPARATUS AND FEED TRAY THAT INCLUDES A SIDE GUIDE INSIDE A PAIR OF SIDEWALLS FOR ROLL PAPER

REFERENCE TO RELATED APPLICATIONS

This application claims priority from Japanese Patent Application No. 2022-028367 filed on Feb. 25, 2022. The entire content of the priority application is incorporated herein by reference.

BACKGROUND ART

A related art discloses a paper feed tray (feed tray) including a pair of side plates (side walls) and side guides located in the pair of side plates. The paper feed tray is applied to a printer portion (image recording apparatus). The paper feed tray can accommodate sheets in a stacked state, and the sheets accommodated in the paper feed tray are sequentially fed from an uppermost sheet by a feeding roller.

DESCRIPTION

In the above-described related art, the paper feed tray can accommodate sheets in a stacked state, and the sheets accommodated in the paper feed tray are sequentially fed from the uppermost sheet by the feeding roller. In that configuration, on an inner-side surface (surface which can come into contact with a side edge of the sheet) of the side guide, a point with which the side edge of the sheet comes into contact is not constant, but change in an up-down direction according to the number (position of the uppermost sheet) of sheets accommodated. Therefore, the side guide is less likely to wear due to contact with the sheet.

However, when the feed tray is configured to accommodate a roll body, a position of an edge of a sheet-shaped medium unrolled from the roll body can be fixed without changing in the up-down direction. In this case, when the inner-side surface of the side guide comes into contact with the edge of the sheet-shaped medium at a constant point and the inner-side surface of the side guide is made of resin or the like, the side guide is likely to wear due to contact with the sheet-shaped medium.

Therefore, illustrative aspects of the present disclosure provide an image recording apparatus and a feed tray which reduces wear of a side guide in a structure in which the feed tray is configured to accommodate a roll body.

An image recording apparatus includes: a feed tray; a feed mechanism configured to feed a sheet-shaped medium accommodated in the feed tray; and a recording device configured to record an image on the sheet-shaped medium fed by the feed mechanism. The feed tray includes: a first accommodation portion configured to accommodate a roll, in which the sheet-shaped medium is rolled; a pair of side walls, the pair of side walls being configured to interpose the sheet-shaped medium unrolled from the roll accommodated in the first accommodation portion in a first direction, the first direction being parallel to an axis of the roll; and a side guide disposed inside the pair of side walls, the side guide having an inner-side surface contactable with an edge in the first direction of the first sheet-shaped medium unrolled from the roll accommodated in the first accommodation portion. The side guide has a metal portion, the metal portion being made of metal, the metal portion forming at least part of the inner-side surface.

A feed tray includes: a first accommodation portion configured to accommodate a roll in which a sheet-shaped medium is rolled; a pair of side walls interposing the sheet-shaped medium unrolled from the roll accommodated in the first accommodation portion in a first direction, the first direction being parallel to an axis of the roll; and a side guide located inside the pair of side walls, the side guide having an inner-side surface contactable with an edge in the first direction of the sheet-shaped medium unrolled from the roll accommodated in the first accommodation portion. The side guide has a metal portion, the metal portion being made of metal, the metal portion forming at least part of the inner-side surface.

According to the present disclosure, the metal portion is provided on the inner-side surface of the side guide, and the wear of the side guide can be reduced by bringing the edge of the sheet-shaped medium into contact with the metal portion.

OVERALL CONFIGURATION OF PRINTER

First, an overall configuration of a printer 1 (which is one example of an image recording apparatus) according to an illustrative embodiment of the present disclosure will be described with reference to FIGS. 1 to 3.

Figure 1:
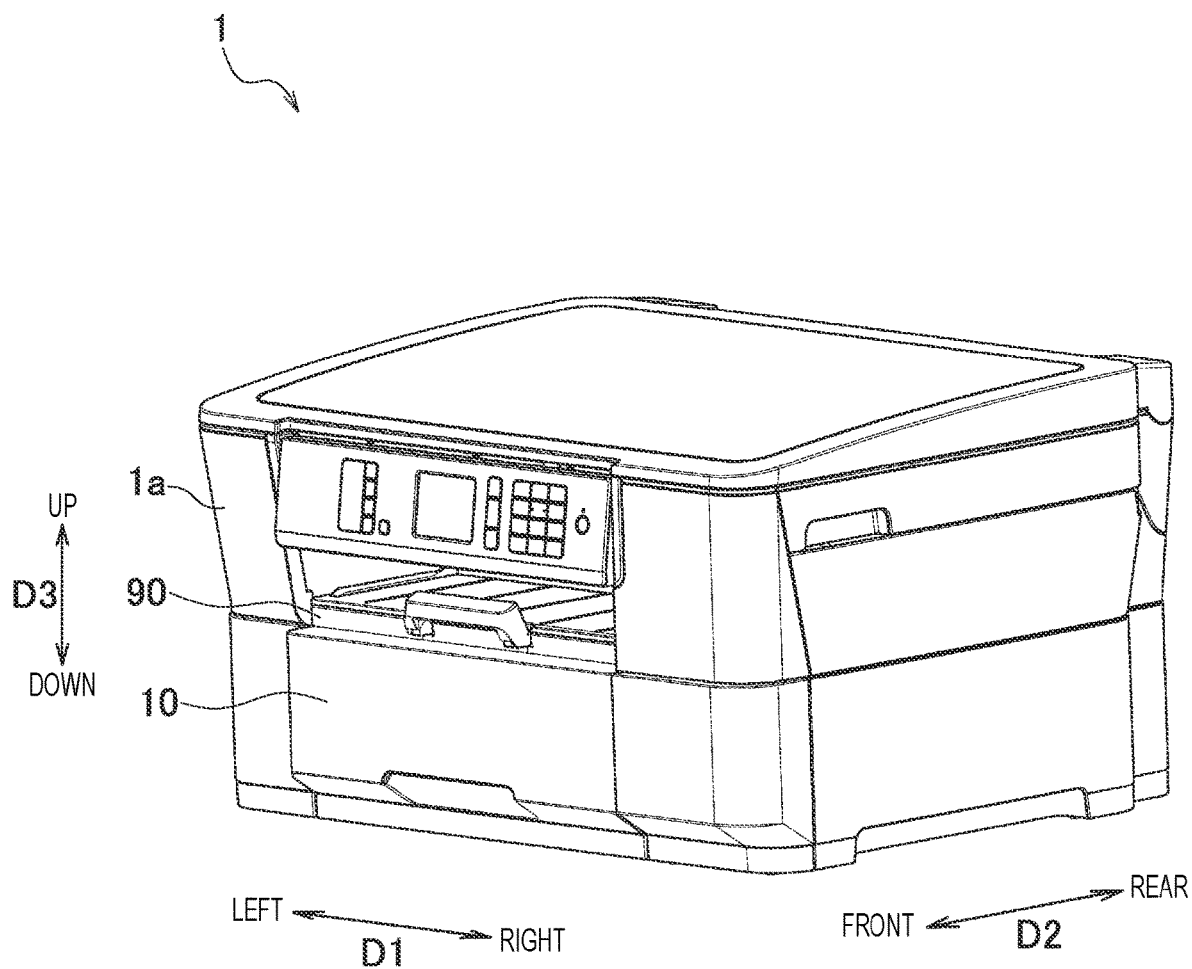
FIG. 1 is a perspective view of a printer, which is an illustrative embodiment of an image recording apparatus according to the present disclosure.

As illustrated in FIG. 1, the printer 1 includes a housing 1a, a paper feed tray 10 (corresponding to a "feed tray" of the present disclosure) detachable from the housing 1a, and a paper discharge tray 90.

Widths (lengths in a left-right direction D1 (first direction)) of the paper feed tray 10 and the paper discharge tray 90 are substantially the same. The paper feed tray 10 has a box shape with an upward opening, and is attachable to and detachable from the housing 1a in a front-rear direction D2 (second direction). The paper feed tray 10 is pulled out of the housing 1a by being moved forward relative to the housing 1a, and attached to the housing 1a by being moved rearward relative to the housing 1a. In a state where the paper feed tray 10 is attached to the housing 1a, the paper feed tray 10 and the paper discharge tray 90 overlap each other in an up-down direction D3 (third direction).

Figure 2:
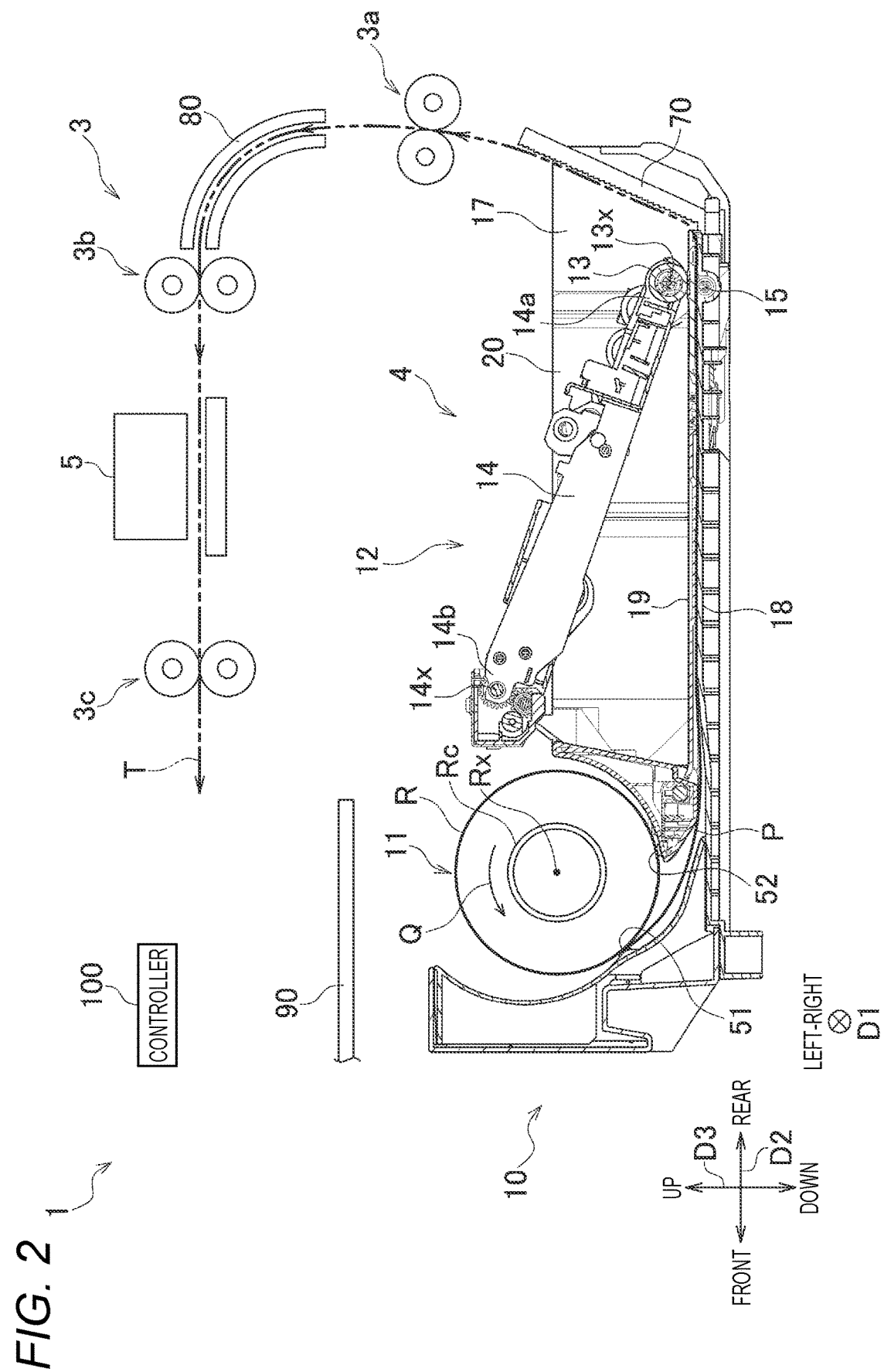
FIG. 2 is a schematic side view illustrating an internal structure of the printer of FIG. 1.
Figure 3:
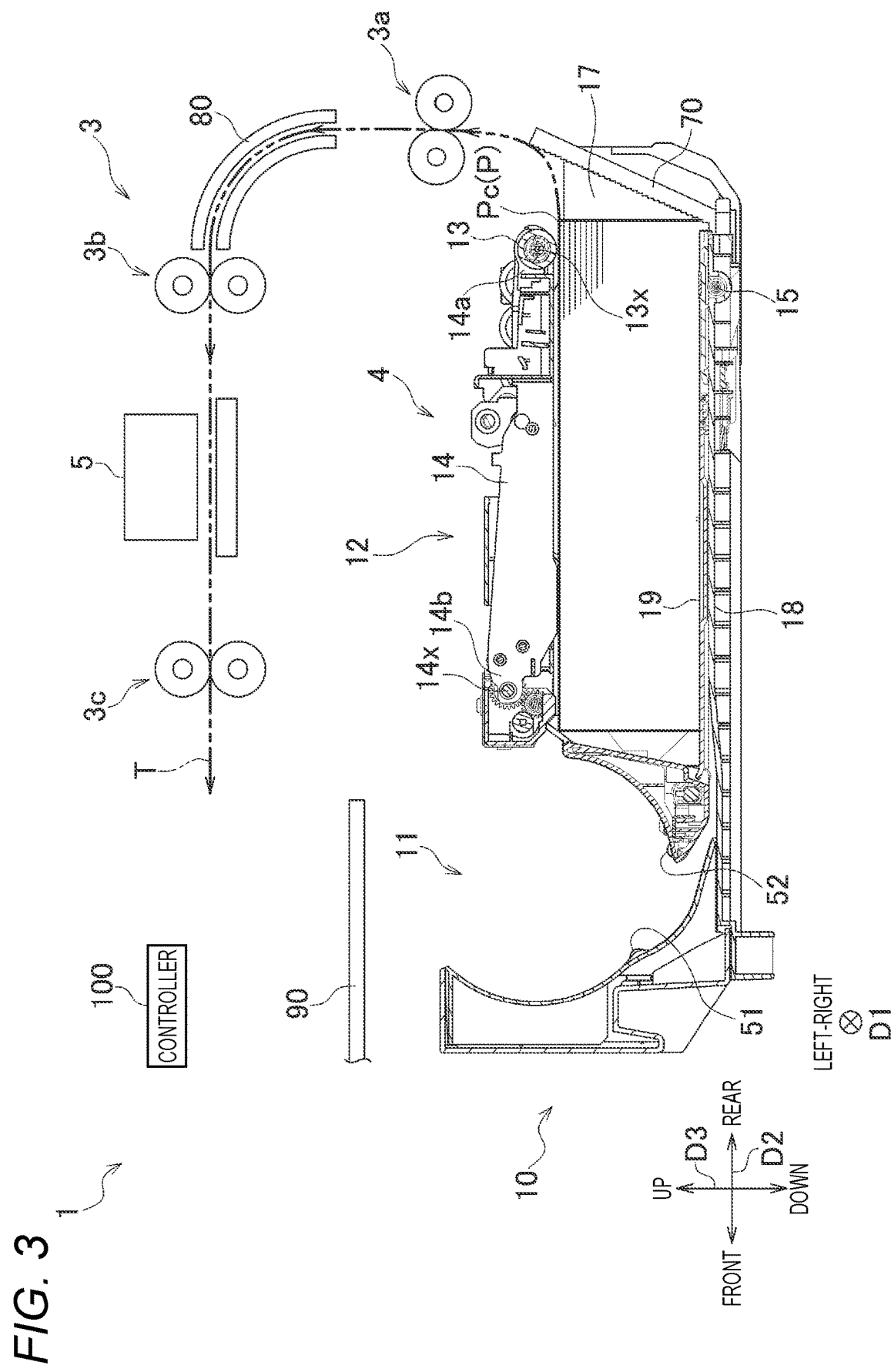
FIG. 3 is a schematic side view corresponding to FIG. 2, illustrating a state in which a maximum number of cut papers is accommodated in a paper feed tray in the printer of FIG. 1.

The printer 1 further includes a conveyance mechanism 3, a head 5, and a controller 100, as illustrated in FIGS. 2 and 3. Elements of the conveyance mechanism 3 other than rollers 51 and 52, which will be described below, the head 5, and the controller 100 are supported by the housing 1a.

The conveyance mechanism 3 is configured to convey a sheet P along a conveyance path T, and includes the rollers 51 and 52, a roller 13 and an arm 14, roller pairs 3a to 3c, a separating member 70, a pair of guide members 80, and a conveying motor (not illustrated) for driving each roller described above. The conveyance path T is a path from the paper feed tray 10 to the paper discharge tray 90 through between the pair of guide members 80 and below the head 5.

The rollers 51 and 52, the roller 13 and the arm 14 of the conveyance mechanism 3 form a feed mechanism 4 which is configured to feed the sheet P accommodated in the paper feed tray 10.

The sheet P is a general term for a sheet P unwound or unrolled from a roll paper R, which will be described below, and a cut paper Pc, and corresponds to a "sheet-shaped medium" of the present disclosure. The cut paper Pc is a sheet P of which the length along the conveyance path T is shorter than that of the sheet P forming the roll paper R.

The paper feed tray 10 includes a roll paper accommodation portion 11 which is configured to accommodate the roll paper R (see FIG. 2), and a cut paper accommodation portion 12 which is configured to accommodate a plurality of cut papers Pc (see FIG. 3) stacked in the up-down direction D3. The roll paper accommodation portion 11 corresponds to a "first accommodation portion" of the present disclosure, and the cut paper accommodation portion 12 corresponds to a "second accommodation portion" of the present disclosure. The cut paper Pc accommodated in the cut paper accommodation portion 12 is supported on an upper surface of a support plate 19 located along a bottom plate 18 of the paper feed tray 10.

In the paper feed tray 10, when using the roll paper R, the cut paper Pc is removed from the cut paper accommodation portion 12 (see FIG. 2), whereas when using the cut paper Pc, the roll paper R is removed from the roll paper accommodation portion 11 (see FIG. 3). The cut paper accommodation portion 12 is a space behind the roll paper accommodation portion 11.

The roll paper R is a long sheet P rolled around an outer peripheral surface of a core member Rc having a cylindrical shape, and corresponds to a "roll body" of the present disclosure. The roll paper R is accommodated in the roll paper accommodation portion 11 with a rotation axis Rx (a central axis of the core member Rc) extending along the left-right direction D1.

The rollers 51 and 52 are located at a bottom portion of the roll paper accommodation portion 11. The rollers 51 and 52 are rotatable around axes extending in the left-right direction D1. When the roll paper R is accommodated in the roll paper accommodation portion 11, a lower outer peripheral surface of the roll paper R is supported by the rollers 51 and 52. When setting the roll paper R, the roll paper R is manually rotated in an arrow direction Q in FIG. 2, and the sheet P is unrolled from the roll paper R. Then, the sheet P is passed through a gap between a lower surface of the support plate 19 and an upper surface of the bottom plate 18, and a leading end of the sheet P is interposed between the roller 13 and a roller 15. In this state, the conveying motor is driven under control of the controller 100, and the rollers 51, 52, and 13 are rotated, whereby the sheet P unrolled from the roll paper R is fed from front (upstream side) to rear (downstream side) in the front-rear direction D2.

The roller 13 is supported by one end 14a of the arm 14 and is rotatable about an axis 13x extending along the left-right direction D1. The other end 14b of the arm 14 is supported by the housing 1a (see FIG. 1) via an axis 14x extending along the left-right direction D1. The arm 14 is rotatable around the axis 14x with the other end 14b as a fulcrum (see FIGS. 2 and 3).

In a state where the paper feed tray 10 is attached to the housing 1a, the roller 13 comes in contact with an upper surface of the support plate 19 when no cut paper Pc is accommodated in the cut paper accommodation portion 12 (see FIG. 2). In a state where the paper feed tray 10 is attached to the housing 1a and the cut paper Pc is accommodated in the cut paper accommodation portion 12, the roller 13 is in contact with an uppermost cut paper of the cut papers Pc accommodated in the cut paper accommodation portion 12 (see FIG. 3). In this case, the conveying motor is driven under the control of the controller 100 to rotate the roller 13, thereby feeding the cut paper Pc from front to rear in the front-rear direction D2.

The sheet P (sheet P unrolled from the roll paper R accommodated in the roll paper accommodation portion 11, or cut paper Pc accommodated in the cut paper accommodation portion 12) fed from the paper feed tray 10 by the roller 13 comes into contact with the separating member 70, moves along the separating member 70, and is guided to the roller pair 3a.

The separating member 70 is located behind the roller 13. The separating member 70 extends in an oblique direction crossing both the up-down direction D3 and the front-rear direction D2. In other words, the separating member 70 is inclined upward toward the rear. On a surface (surface defining the conveyance path T) of the separating member 70, fine unevenness that repeats along the conveyance path T is formed. Due to the unevenness, double feeding (phenomenon in which a plurality of cut papers Pc are conveyed while overlapping each other) is reduced. In other words, the separating member 70 has a function of separating the cut paper Pc in contact with the roller 13 and the other cut paper Pc.

The head 5 (corresponding to a "recording device" of the present disclosure) includes a plurality of nozzles (not illustrated) formed on a lower surface and a driver IC. When the sheet P conveyed by the conveyance mechanism 3 passes through a position facing the lower surface of the head 5, by driving the driver IC under the control of the controller 100, ink is ejected from the nozzles and lands on the sheet P, so that an image is recorded on the sheet P. The head 5 may be either a line type in which ink is ejected from nozzles in a fixed position, or a serial type in which ink is ejected from nozzles while moving in the left-right direction D1.

The controller 100 is connected to the conveying motor and the driver IC via an internal bus (not illustrated). The controller 100 includes a central processing unit (which will be abbreviated as CPU), a read only memory (which will be abbreviated as ROM), and a random access memory (which will be abbreviated as RAM). The ROM stores programs and data for the CPU to perform various controls. The RAM temporarily stores data used when the CPU executes programs.

{Paper Feed Tray}

Next, referring to FIGS. 4-8, a configuration of the paper feed tray 10 will be described in detail.

Figure 4:
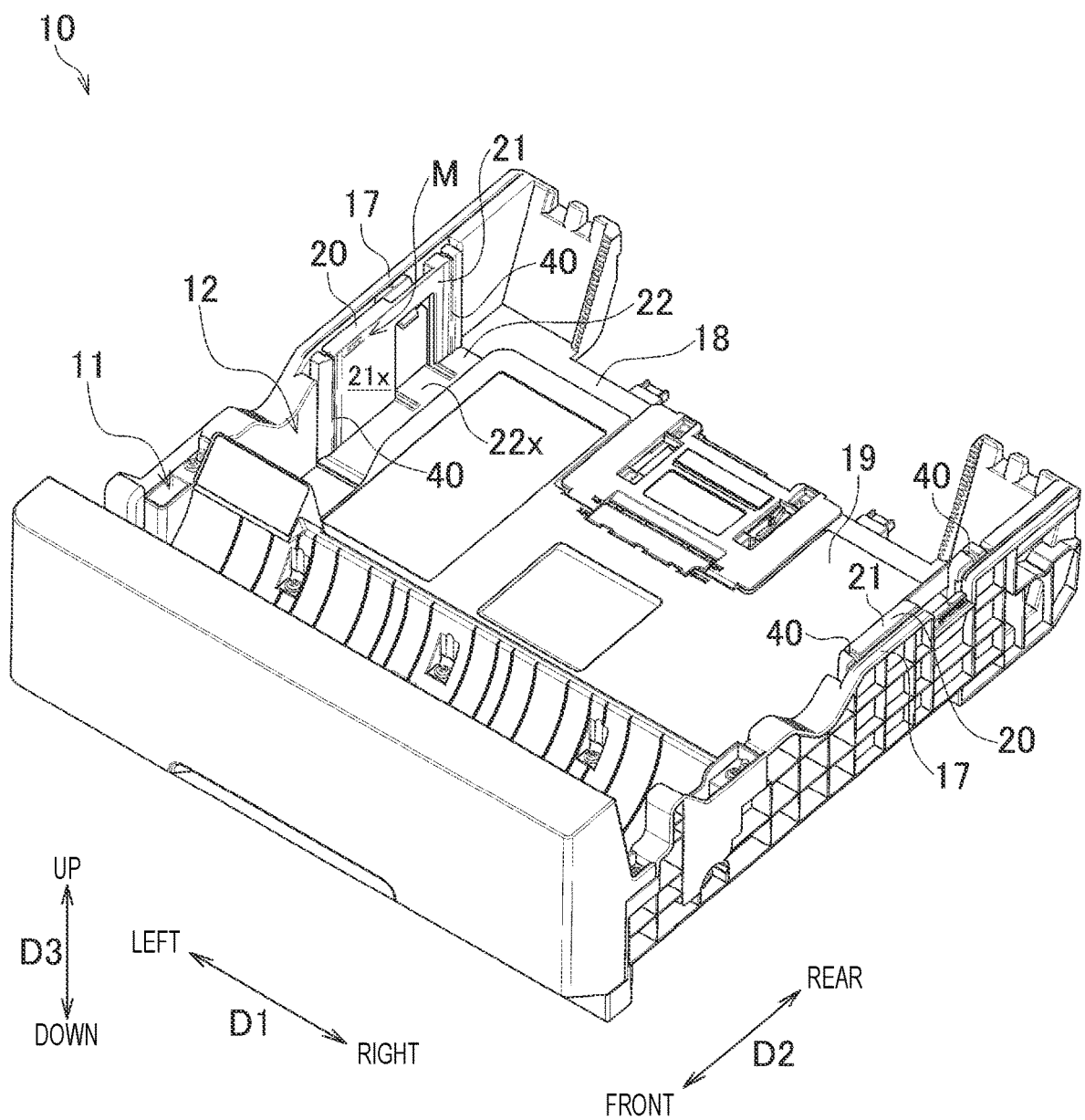
FIG. 4 is a perspective view illustrating the paper feed tray included in the printer of FIG. 1.

As illustrated in FIG. 4, the paper feed tray 10 has a pair of side walls 17 and a pair of guide units 20 in addition to the bottom plate 18 and support plate 19 described above.

The pair of side walls 17 are plate-shaped members forming left and right side surfaces of the paper feed tray 10, respectively, and are separated from each other in the left-right direction D1. The pair of side walls 17 interpose the sheet Pin the left-right direction D1.

The pair of guide units 20 are located in the pair of side walls 17 and consist of a left guide unit 20 and a right guide unit 20. Each guide unit 20 includes a side guide 21 located parallel to the side wall 17, a support member 22 located parallel to the bottom plate 18, and a connecting member 23 (see FIG. 5).

The side guide 21 of the left guide unit 20 and the side guide 21 of the right guide unit 20 are separated from each other in the left-right direction D1. The support member 22 of the left guide unit 20 and the support member 22 of the right guide unit 20 are separated from each other in the left-right direction D1.

Figure 5:
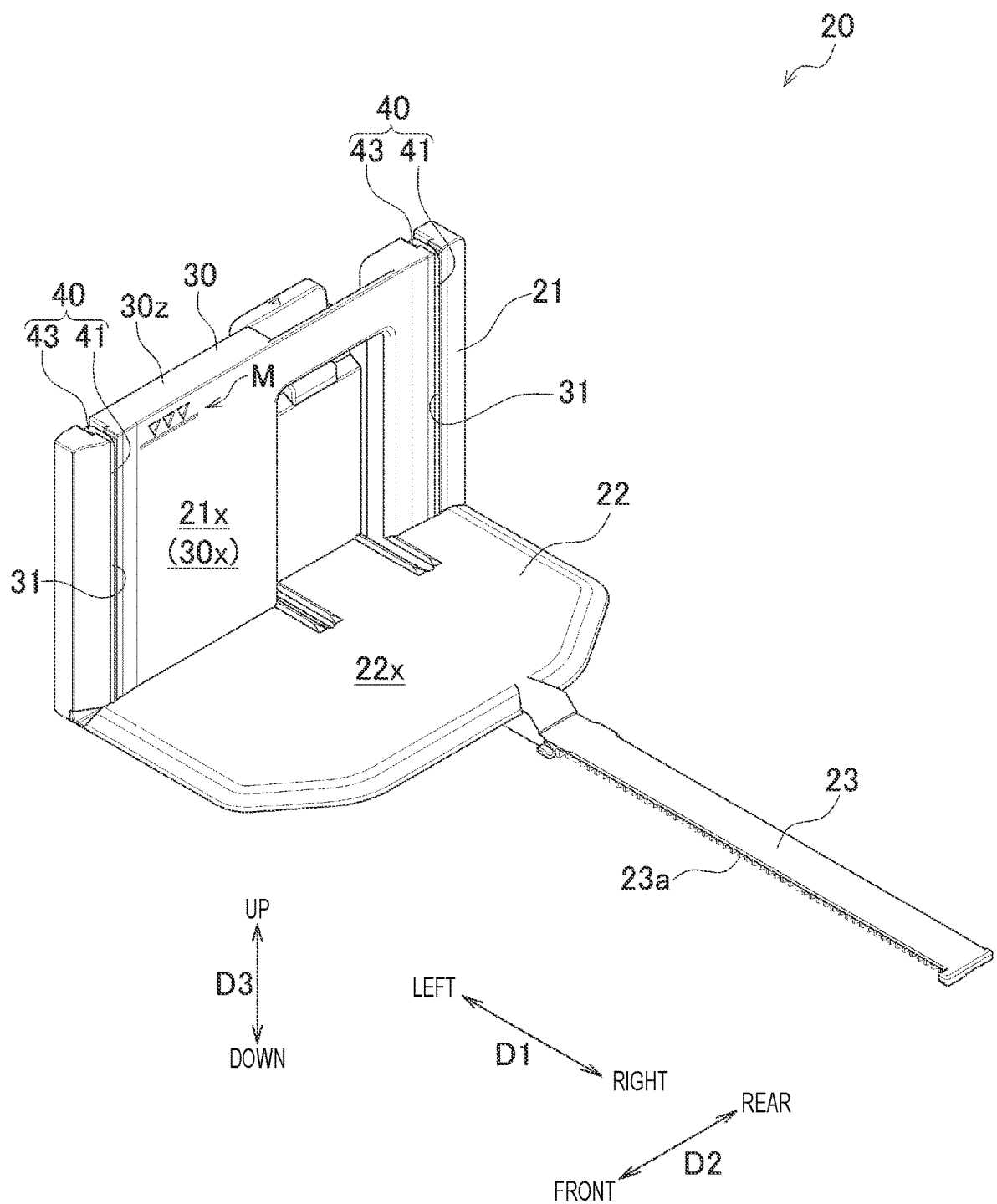
FIG. 5 is a perspective view illustrating one of a pair of guide units included in the paper feed tray of FIG. 4.

In the left guide unit 20, the connecting member 23 extends rightward from a right end of the support member 22, and the side guide 21 extends upward from a left end of the support member 22 (see FIG. 5). In the right guide unit 20, the connecting member 23 extends leftward from a left end of the support member 22, and the side guide 21 extends upward from a right end of the support member 22 (not illustrated). In each guide unit 20, the side guide 21 and the support member 22 are aligned in the left-right direction D1.

The left guide unit 20 and the right guide unit 20 are connected to each other through the connecting members 23 of the respective guide units 20. Specifically, a lower surface of the connecting member 23 of the left guide unit 20 is formed with a concave-convex portion 23a (see FIG. 5), and an upper surface of the connecting member 23 of the right guide unit 20 is formed with a concave-convex portion 23a (not illustrated). The left guide unit 20 and the right guide unit 20 are connected to each other by engaging the concave-convex portion 23a of the connecting member 23 of each guide unit 20. By changing an engaging position of the concave-convex portion 23a, the side guide 21 of each guide unit 20 can move in the left-right direction D1.

The support member 22 is positioned along the bottom plate 18 of the paper feed tray 10, and the sheet P unrolled from the roll paper R accommodated in the roll paper accommodation portion 11 is supported on an upper surface of the bottom plate 18 and an upper surface of the support member 22. The cut paper Pc accommodated in the cut paper accommodation portion 12 is supported on the upper surface of the support plate 19 that is supported on the upper surface of the support member 22. Thus, the upper surface of the support member 22 corresponds to a support surface 22x that supports the sheet P.

An inner-side surface 21x of the side guide 21 can be brought into contact with an edge of the sheet P in the left-right direction D1. A mark M is drawn on the inner-side surface 21x to indicate a position corresponding to an uppermost cut paper Pc when the maximum number of cut papers Pc is accommodated in the cut paper accommodation portion 12.

The side guide 21 is composed of a base portion 30 made of resin or the like and two rod members 40 attached to the base portion 30. The two rod members 40 are each made of metal (for example, iron, stainless steel, or the like) and correspond to a "metal portion" of the present disclosure. The metal forming the rod member 40 has higher wear resistance than the material (resin or the like) forming the base portion 30.

The base portion 30 is a plate-shaped member that forms an outer shape of the side guide 21. The base portion 30 includes an inner surface 30x forming the inner-side surface 21x of the side guide 21, an outer surface 30y opposite to the inner surface 30x in the left-right direction D1, and an upper surface 30z (see FIG. 6).

Two grooves 31 extending in the up-down direction D3 are formed in the inner surface 30x of the base portion 30 (see FIG. 5). The two grooves 31 are separated from each other in the front-rear direction D2 and provided at front and rear end portions of the base portion 30. The groove 31 is formed continuously not only on the inner surface 30x of the base portion 30 but also on the upper surface 30z and the outer surface 30y of the base portion 30 (see FIGS. 5 and 6).

The two rod members 40 are respectively fitted into the two grooves 31. Therefore, as similar to the two grooves 31, the two rod members 40 are separated from each other in the front-rear direction D2 and provided at the front and rear end portions of the base portion 30.

Figure 7:
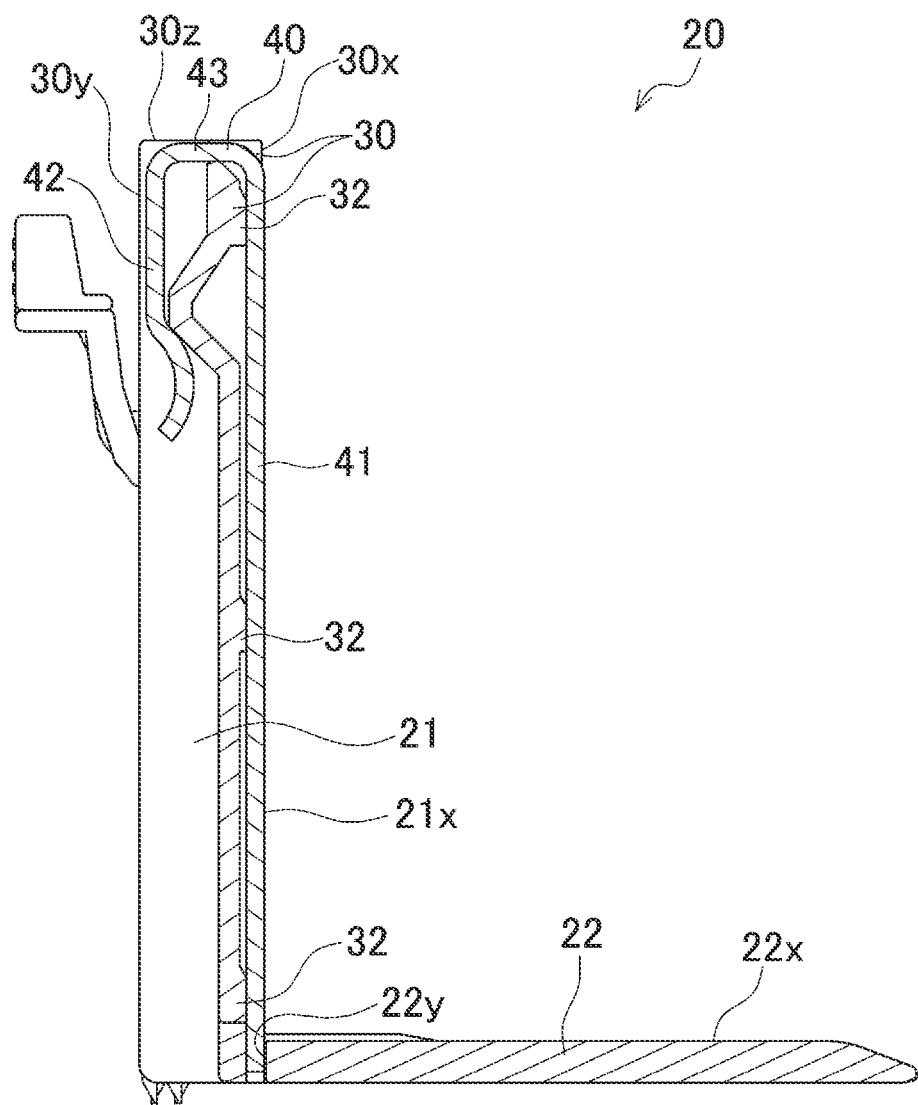
FIG. 7 is a cross-sectional view of the guide unit taken along the line VII-VII in FIG. 6.
Figure 7:
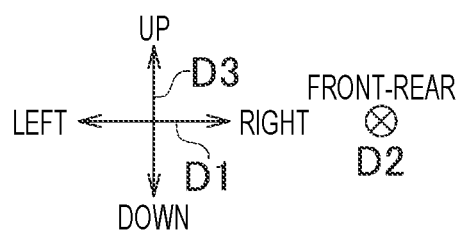

As illustrated in FIG. 7, the rod member 40 includes a first portion 41 located on the inner surface 30x of the base portion 30, a second portion 42 located on the outer surface 30y of the base portion 30, and a third portion 43 located on the upper surface 30z of the base portion 30. The first portion 41 and the second portion 42 extend in the up-down direction D3. The third portion 43 extends in the left-right direction D1 and connects the first portion 41 and the second portion 42. Thus, the rod member 40 has a substantially U-shape and pinches the base portion 30 in the left-right direction D1.

The shape of the three portions 41 to 43 may be cylindrical, prismatic, or the like.

Of the three portions 41 to 43 of the rod member 40, the first portion 41 forms the inner-side surface 21x of the side guide 21 together with the inner surface 30x of the base portion 30. Here, the first portion 41 protrudes further inward in the left-right direction D1 than the inner surface 30x of the base portion 30. As a result, the edge of the sheet P in the left-right direction D1 is in contact with the first portion 41 instead of the inner surface 30x of the base portion 30. The first portion 41 is supported by three protrusions 32 formed in the groove 31 of the base portion 30, as illustrated in FIG. 7. The three protrusions 32 are separated from each other in the up-down direction D3.

The first portion 41 extends from an upper end of the base portion 30 to near a lower end, and extends over substantially the entire length of the side guide 21 in the up-down direction D3. A lower end of the first portion 41 is inserted into a through-hole 22y formed in the support member 22. The through-hole 22y is open to the support surface 22x and corresponds to an "opening" of the present disclosure.

In other words, in the up-down direction D3, the first portion 41 extends from the upper end (position distant from the support surface 22x) of the base portion 30, passing through a position (position where the mark M (see FIG. 5) is drawn) corresponding to the uppermost cut paper Pc when the maximum number of cut papers Pc is accommodated in the cut paper accommodation portion 12 and a position corresponding to the support surface 22x, and further below the support surface 22x.

Figure 8:
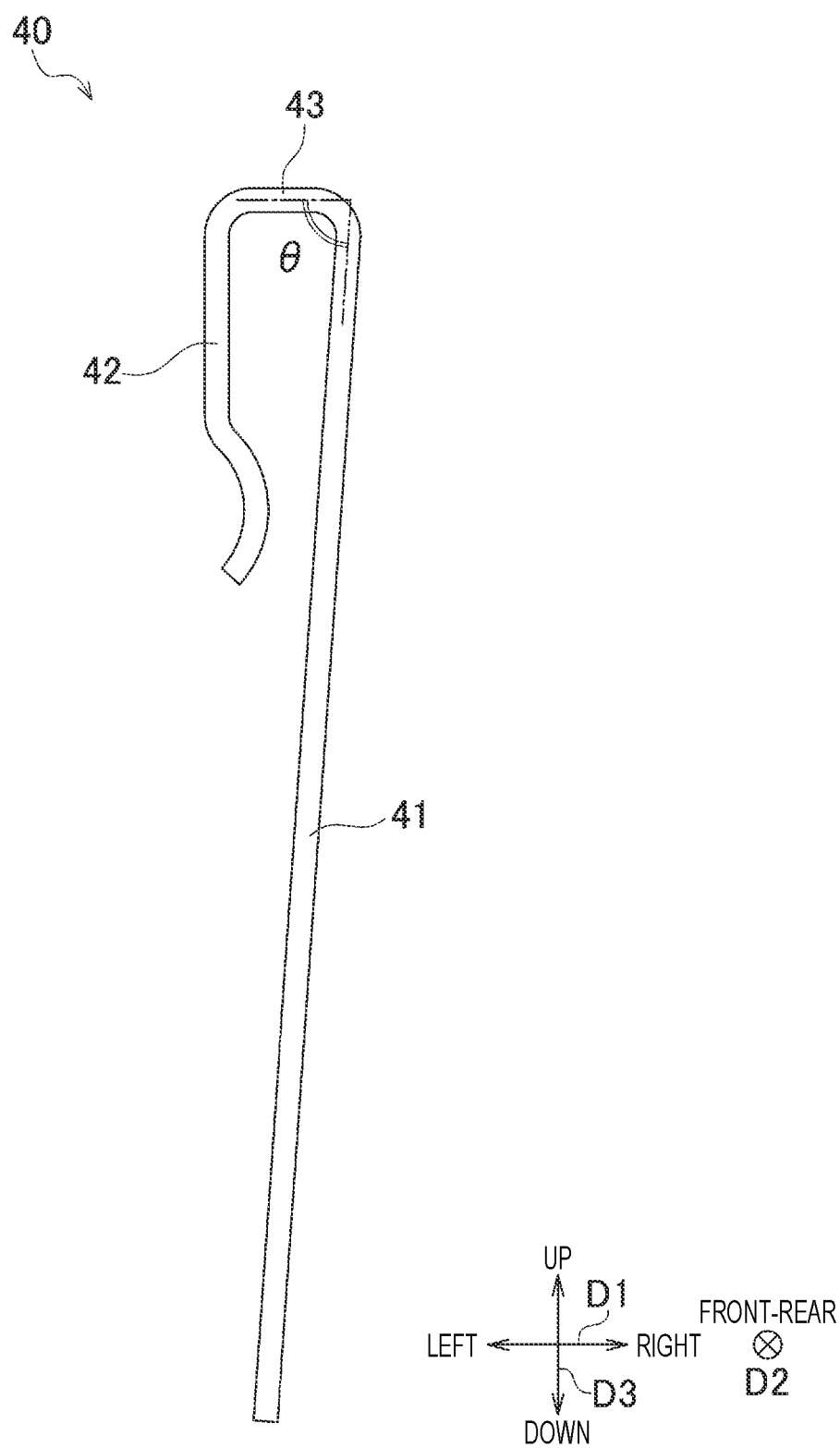
FIG. 8 is a side view illustrating a metal rod provided in the guide unit.

An upper end (one end) of the second portion 42 is connected to the third portion 43. A portion (near the other end) including a lower end (the other end) of the second portion 42 is curved or bent toward the first portion 41 in the left-right direction D1. Further, as illustrated in FIG. 8, the rod member 40 forms an acute angle θ between the first portion 41 and the third portion 43 when the rod member 40 is not attached to the base portion 30.

As described above, according to the present illustrative embodiment, the paper feed tray 10 of the printer 1 includes the roll paper accommodation portion 11 which can accommodate the roll paper R, the pair of side walls 17 interposing the sheet P unrolled from the roll paper R accommodated in the roll paper accommodation portion 11 in the left-right direction D1, and the side guides 21 located in the pair of side walls 17. The inner-side surface 21x of the side guide 21 can come into contact with the edge of the sheet in the left-right direction D1. At least part of the inner-side surface 21x is composed of the rod member 40 (metal portion) made of metal (see FIGS. 4 to 7). In this case, wear of the side guides 21 can be reduced by bringing the edges of the sheet P in the left-right direction D1 into contact with the rod members 40.

Figure 6:
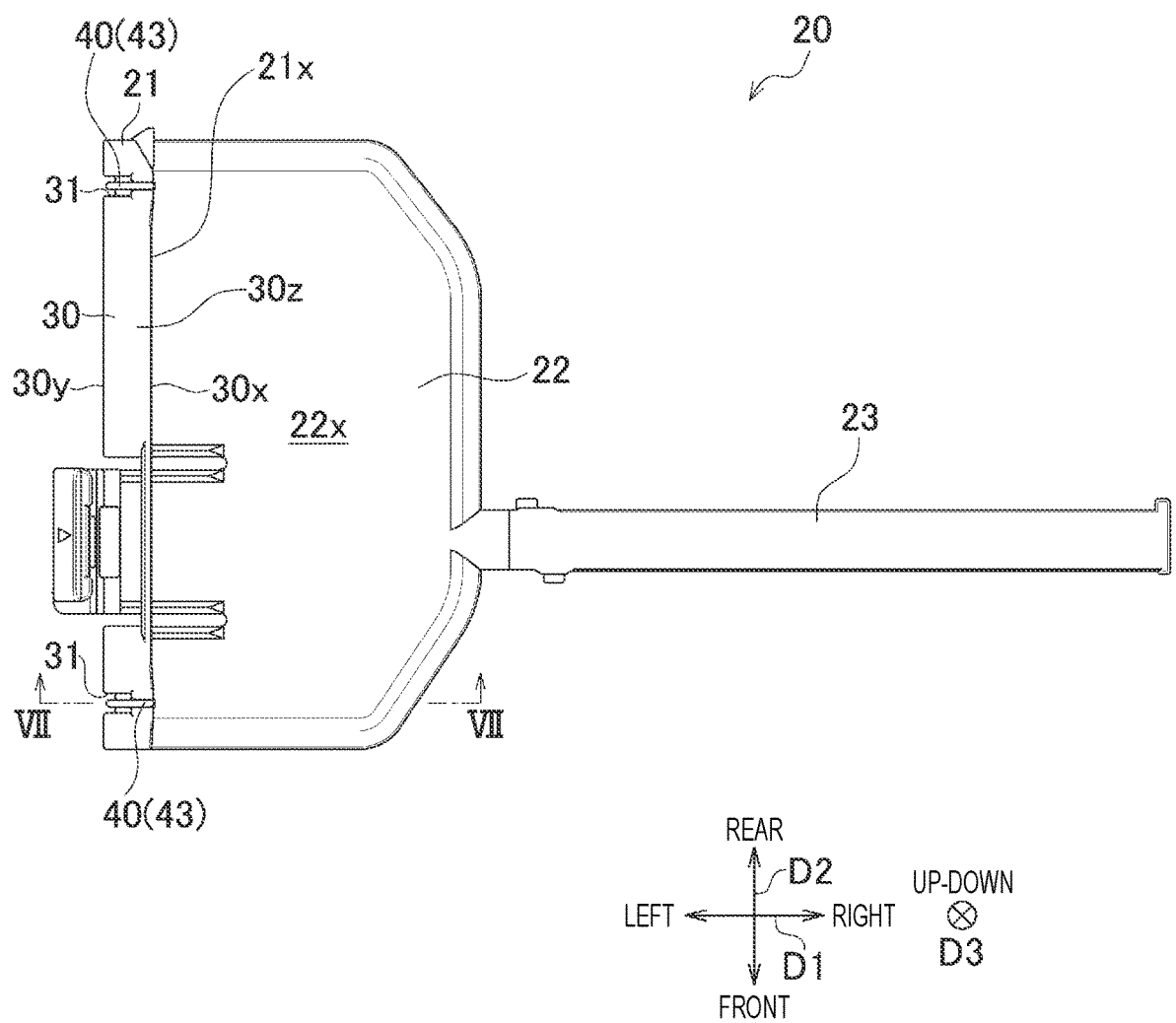
FIG. 6 is a plan view of the guide unit of FIG. 5.

The side guide 21 includes the rod member 40 (metal portion) and the base portion 30 made of a material having lower wear resistance than the metal forming the rod member 40, and the first portion 41 of the rod member 40 protrudes further inward in the left-right direction D1 than the inner surface 30x of the base portion 30 (see FIGS. 6 and 7). In this case, cost reduction can be achieved by configuring the base portion 30 with a material having low wear resistance and having a lower cost than metal. In addition, by limiting a point with which the edge of the sheet P in the left-right direction D1 comes into contact and accurately bringing the edge of the sheet P in the left-right direction D1 into contact with the first portion 41 of the rod member 40 instead of the base portion 30, the wear of the base portion 30 can be reduced.

The rod member 40 pinches the base portion 30 in the left-right direction D1 with the three portions 41 to 43 (see FIG. 7). For example, when the rod member 40 has only the first portion 41 and the first portion 41 is press-fitted into the base portion 30 in the up-down direction D3, the base portion 30 needs to be provided with a portion to support the first portion 41 around its axis, and this portion protrudes inward, possibly degrading a guiding function. In this regard, in the present illustrative embodiment, it is not necessary to provide the above-described portion in the base portion 30, and deterioration of the guiding function can be reduced.

The angle θ between the first portion 41 and the third portion 43 is an acute angle (see FIG. 8). In this case, the rod member 40 can be firmly fixed to the base portion 30, and the rod member 40 can be prevented from coming off the base portion 30.

A portion (near the other end) including the lower end (the other end) of the second portion 42 is curved or bent toward the first portion 41 in the left-right direction D1 (see FIGS. 7 and 8). In this case, the rod member 40 can be more firmly fixed to the base portion 30, and the rod member 40 can be prevented from coming off the base portion 30 more reliably.

The rod member 40 fits into the groove 31 formed in the base portion 30 (see FIGS. 5 to 7). In this case, the position of the rod member 40 is defined by the groove 31, and the edge of the sheet P in the left-right direction D1 can be stably brought into contact with the rod member 40.

The rod member 40 is supported by the three protrusions 32 formed in the groove 31 of the base portion 30 and separated from each other in the up-down direction D3 (see FIG. 7). In this case, an amount of protrusion of the rod member 40 is defined by the protrusions 32, and the edge of the sheet P in the left-right direction D1 can be stably brought into contact with the rod member 40.

The Two rod members 40 separated from each other in the front-rear direction D2 are provided for one side guide 21 (see FIGS. 5 and 6). In this case, the edge of the sheet P in the left-right direction D1 can be reliably brought into contact with the rod member 40. Further, when the roll paper R is set, the edge in the left-right direction D1 of the sheet P unrolled from the roll paper R is likely to come into contact with a front portion of the side guide 21. By providing the rod member 40 at the front portion, the wear of the side guide 21 can be suppressed more reliably.

The rod member 40 extends from the position distant from the support surface 22x to the position corresponding to the support surface 22x in the up-down direction D3 (see FIG. 7). When there is no rod member 40 at the position corresponding to the support surface 22x in the up-down direction D3, the side guide 21 may be worn by the edge in the left-right direction D1 of the sheet P located in a vicinity of the support surface 22x of the support member 22 and fed by the roller 13. Also, when the side guide 21 is composed of the base portion 30 and the rod member 40, if the rod member 40 does not reach the position corresponding to the support surface 22x in the up-down direction D3, and a gap in the up-down direction D3 is formed between the rod member 40 and the support surface 22x, the edge in the left-right direction D1 of the sheet P placed in the vicinity of the support surface 22x may get into the gap and the side guide 21 may be damaged. In this regard, in the present illustrative embodiment, since the rod member 40 reaches the position corresponding to the support surface 22x in the up-down direction D3, a gap in the up-down direction D3 is not formed between the rod member 40 and the support surface 22x, and thus the problem described above can be reduced.

In the up-down direction D3, the rod member 40 extends from the position (position where the mark M (see FIG. 5) is drawn) corresponding to the uppermost cut paper Pc when the maximum number of cut papers Pc is accommodated in the cut paper accommodation portion 12 to the position corresponding to the support surface 22x (see FIG. 7). In this case, from a state in which the cut paper accommodation portion 12 accommodates the maximum number of cut papers Pc to a state in which the minimum number of cut papers Pc is accommodated, the wear of the side guide 21 due to contact with the edge in the left-right direction D1 of the cut paper Pc accommodated in the cut paper accommodation portion 12 can be reduced.

The rod member 40 is inserted into the through-hole 22y that opens to the support surface 22x of the support member 22 (see FIG. 7). In this case, it is possible to effectively realize a configuration in which the rod member 40 is located at a position corresponding to the support surface 22x in the up-down direction D3.

A pair of side guides 21 are provided separated from each other in the left-right direction D1 (see FIG. 4). In this case, the guiding function is improved.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although a plurality of rod members are provided for one side guide in the illustrative embodiment described above, one or three or more rod members may be provided for one side guide.

Figure 9:
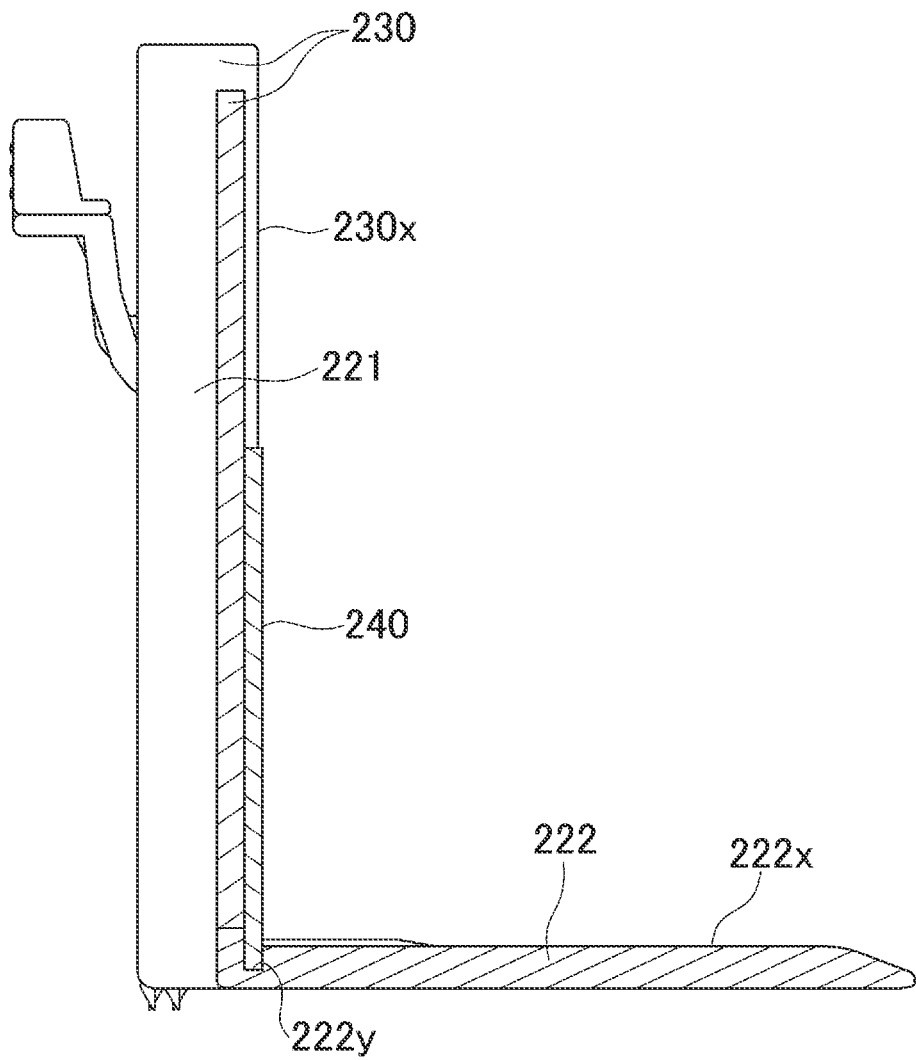
FIG. 9 is a cross-sectional view corresponding to FIG. 7, illustrating a modification example of the side guide according to the present disclosure.

The rod member may include the first portion and may not include the second portion and the third portion. For example, in the modification example of FIG. 9, a rod member 240 includes only a first portion located on an inner surface 230x of a base 230.

The rod member is not limited to being supported by the plurality of protrusions provided in the groove of the base, but may be supported on a bottom surface of the groove of the base. For example, in the modification example of FIG. 9, the rod member 240 is supported on the bottom surface of the groove of the base 23.

The rod member is not limited to fitting into the groove of the base, and may be provided in a portion of the inner surface of the base where no groove is formed.

The metal portion does not have to extend to a position corresponding to the uppermost sheet-shaped medium when the maximum number of sheet-shaped media is accommodated in the second accommodation portion in the third direction. For example, in the modification example of FIG. 9, the rod member 240 (metal portion) extends from a central portion of the base 230 in the up-down direction D3 to a vicinity of the lower end. Even when the rod member 240 does not extend above the side guide 221, the sheet P unrolled from the roll paper R is placed in the vicinity of a support surface 222x, and thus the wear of the side guide 221 can be reduced by bringing the edge of the sheet P in the left-right direction D1 into contact with the rod member 240.

Although the opening is configured as the through-hole 22y formed in the support member 22 in the illustrative embodiment described above, it is not limited to this and may be configured as a recess portion. For example, in the modification example of FIG. 9, a support member 222 is formed with a recess portion 222y that opens into the support surface 222x. A lower end of the rod member 240 is inserted into the recess portion 222y.

The metal portion may have a plate shape instead of a rod shape. In this case, in the modification example of FIG. 9, the rod member 240 can be replaced with a plate member extending in the front-rear direction D2, and the concave portion 222y can be replaced with a groove extending in the front-rear direction D2.

In the third direction, the metal portion only needs to be positioned to correspond to the support surface, and does not have to extend below the position corresponding to the support surface.

It is not limited to providing a pair of side guides separated from each other in the first direction, and one side guide may be provided.

Although the inner-side surface of the side guide is made up of the base and the metal portion in the illustrative embodiment described above, it may be made up of only the metal portion.

In the illustrative embodiment described above, the feed mechanism is an arm feeding type that accompanies pivoting of the arm, but is not limited to this, and may be a pressing plate lifting type (type in which a pressure plate that supports sheet-shaped media is urged upward by an urging member, and the pressure plate moves up and down according to the number of sheet-shaped media accommodated).

The sheet-shaped medium is not limited to paper, and may be cloth or plastic film. That is, the sheet-shaped medium may be made of any material as long as it is in the form of a sheet.

In the above-described illustrative embodiments, the roll body R is obtained by rolling the roll paper Rp around the outer peripheral surface of the core member Rc, but the present disclosure is not limited to this. The roll body R may have no core and does not include the core member Rc.

The recording device may eject a liquid (for example, a treatment liquid for aggregating or depositing components in ink) other than ink. Further, the recording device is not limited to a liquid ejection type, and may be a laser type, a thermal transfer type, or the like.

The present disclosure is not limited to a printer, but may also be applied to a facsimile, a copier, a multi-function machine, and the like.

What is claimed is:

1. An image recording apparatus comprising: a feed tray;
a feed mechanism configured to feed a sheet-shaped medium accommodated in the feed tray; and
a recording device configured to record an image on the sheet-shaped medium fed by the feed mechanism,
wherein the feed tray comprises: a first accommodation portion configured to accommodate a roll, in which the sheet-shaped medium is rolled;
a pair of side walls, the pair of side walls being configured to interpose the sheet-shaped medium unrolled from the roll accommodated in the first accommodation portion in a first direction, the first direction being parallel to an axis of the roll; and
a side guide disposed inside the pair of side walls, the side guide having an inner-side surface contactable with an edge in the first direction of the sheet-shaped medium unrolled from the roll accommodated in the first accommodation portion, and
wherein the side guide has a metal portion, the metal portion being made of metal, the metal portion forming at least part of the inner-side surface.

2. The image recording apparatus according to claim 1,
wherein the side guide has a base portion, the base portion being made of a material having lower wear resistance than the metal forming the metal portion, the base portion having an inner surface and an outer surface, the inner surface forming the inner-side surface, the outer surface being opposite to the inner surface in the first direction,
wherein the metal portion is configured by a rod member, the rod member comprising a first portion extending in a third direction, the third direction intersecting both the first direction and a second direction, the edge of the sheet-shaped medium extending in the second direction, and
wherein the first portion is located on the inner surface of the base portion and protrudes further inward in the first direction than the inner surface.

3. The image recording apparatus according to claim 2,
wherein the rod member has:
a second portion located on the outer surface of the base portion; and
a third portion connecting the first portion and the second portion, and
wherein the rod member pinches the base portion in the first direction.

4. The image recording apparatus according to claim 3,
wherein an angle formed by the first portion and the third portion is an acute angle.

5. The image recording apparatus according to claim 4,
wherein the second portion has:
a first end connected to the third portion; and
a second end opposite to the first end, and wherein the second end is curved or bent toward the first portion in the first direction.

6. The image recording apparatus according to claim 2, wherein a groove is formed on the inner surface of the base portion, the groove extending in the third direction, and
wherein the rod member fits into the groove.

7. The image recording apparatus according to claim 6, wherein the groove has a plurality of protrusions separated from each other in the third direction, and
wherein the rod member is supported by the plurality of protrusions.

8. The image recording apparatus according to claim 2, wherein a plurality of the rod members is provided separated from each other in the second direction.

9. The image recording apparatus according to claim 1, wherein the feed tray is configured to accommodate the sheet-shaped medium, the sheet-shaped medium including at least one of a first sheet-shaped medium or a second sheet-shaped medium,
wherein the feed tray further comprises:
a second accommodation portion configured to accommodate a plurality of second sheet-shaped media in a stacked state; and
a support member having a support surface configured to support the sheet-shaped medium, the support member being aligned with the side guide in the first direction,
wherein the feed mechanism comprises:
an arm having a first end and a second end, the second end being opposite to the first end, is the arm being pivotable with the second end as a fulcrum; and
a roller that is supported on the first end of the arm, the roller being contactable with the first sheet-shaped medium unrolled from the roll accommodated in the first accommodation portion, or an uppermost second sheet-shaped medium of the plurality of second sheet-shaped media accommodated in the second accommodation portion and being configured to feed the sheet-shaped medium, and
wherein the metal portion extends from a position distant from the support surface to a position corresponding to the support surface in a third direction, the third direction intersecting both the first direction and a second direction, the edge of the sheet-shaped medium extending in the second direction.

10. The image recording apparatus according to claim 9, wherein the metal portion extends from a first position to a second position in the third direction, the first position corresponding to an uppermost second sheet-shaped medium when a maximum number of second sheet-shaped media is accommodated in the second accommodation portion, the second position corresponding to the support surface.

11. The image recording apparatus according to claim 10, wherein a pair of side guides are provided separated from each other in the first direction.

12. The image recording apparatus according to claim 9, wherein the support member has an opening opened to the support surface, and
wherein the metal portion is inserted into the opening.

13. A feed tray comprising:
a first accommodation portion configured to accommodate a roll in which a sheet-shaped medium is rolled;
a pair of side walls interposing the sheet-shaped medium unrolled from the roll accommodated in the first accommodation portion in a first direction, the first direction being parallel to an axis of the roll; and
a side guide located inside the pair of side walls, the side guide having an inner-side surface contactable with an edge in the first direction of the sheet-shaped medium unrolled from the roll accommodated in the first accommodation portion,
wherein the side guide has a metal portion, the metal portion being made of metal, the metal portion forming at least part of the inner-side surface.

14. The feed tray according to claim 13, wherein the side guide has a base portion, the base portion being made of a material having lower wear resistance than the metal forming the metal portion, the base portion having an inner surface and an outer surface, the inner surface forming the inner-side surface, the outer surface being opposite to the inner surface in the first direction,
wherein the metal portion is configured by a rod member, the rod member comprising a first portion extending in a third direction, the third direction intersecting both the first direction and a second direction, the edge of the sheet-shaped medium extending in the second direction, and
wherein the first portion is located on the inner surface of the base portion and protrudes further inward in the first direction than the inner surface.

15. The feed tray according to claim 14, wherein the rod member has:
a second portion located on the outer surface of the base portion; and
a third portion connecting the first portion and the second portion, and
wherein the rod member pinches the base portion in the first direction.

16. The feed tray according to claim 13, wherein the feed tray is configured to accommodate the sheet-shaped medium, the sheet-shaped medium including at least one of a first sheet-shaped medium or a second sheet-shaped medium,
wherein the feed tray further comprises:
a second accommodation portion configured to accommodate a plurality of second sheet-shaped media in a stacked state; and
a support member having a support surface configured to support the sheet-shaped medium, the support member being aligned with the side guide in the first direction, and
wherein the metal portion extends from a position distant from the support surface to a position corresponding to the support surface in a third direction, the third direction intersecting both the first direction and a second direction, the edge of the sheet-shaped medium extending in the second direction.

17. The feed tray according to claim 13, wherein a pair of side guides are provided separated from each other in the first direction.

* * * * *